United States Patent
Yaginuma

(12)
(10) Patent No.: US 6,387,971 B1
(45) Date of Patent: May 14, 2002

(54) SILICONE RUBBER SPONGE COMPOSITION AND SILICONE RUBBER SPONGE OBTAINED THEREFROM

(75) Inventor: Atsushi Yaginuma, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/987,665

(22) Filed: Nov. 15, 2001

(30) Foreign Application Priority Data

Nov. 15, 2000 (JP) ........................................ 2000-348593

(51) Int. Cl.$^7$ .................................................. C08J 9/10
(52) U.S. Cl. ............................ 521/95; 521/96; 521/154
(58) Field of Search ............................. 521/95, 96, 154

(56) References Cited

U.S. PATENT DOCUMENTS 3,776,885 A * 12/1973 MacLeay ................. 260/46.56
4,129,531 A * 12/1978 Rauer et al. .................. 521/94
4,460,748 A * 7/1984 Rauer .......................... 521/95
6,096,792 A 8/2000 Iijima et al.

FOREIGN PATENT DOCUMENTS

JP 8-259816 * 10/1996

* cited by examiner

*Primary Examiner*—Morton Foelak
(74) *Attorney, Agent, or Firm*—Birch, Stewart, Kolasch & Birch, LLP

(57) ABSTRACT

A silicone rubber sponge composition comprising an organopolysiloxane, finely divided silica, a blowing agent in the form of a non-cyano type organic azo compound, typically dimethyl 1,1'-azobis(1-cyclohexane carboxylate), and a curing agent is effectively blowable into a silicone rubber sponge which is safe without a need for long-term post-cure, contains uniform fine cells and has a smooth, tack-free skin layer.

8 Claims, No Drawings

SILICONE RUBBER SPONGE COMPOSITION AND SILICONE RUBBER SPONGE OBTAINED THEREFROM

This invention relates to silicone rubber sponge compositions which cure into silicone rubber sponges suitable for use as building gaskets, sponge rolls, thermal insulating sheets and the like.

BACKGROUND OF THE INVENTION

Silicone sponges possess physical properties characteristic of silicone rubber, namely excellent properties including heat resistance, freeze resistance, electrical insulation, flame retardance and compression set. The silicone rubber sponge is generally formed by adding a curing agent and a blowing agent to a thermosetting silicone rubber compound and heating the composition for blowing and curing into sponge. It is important that the composition be effectively blown into a silicone rubber sponge having a uniform fine cell structure and a smooth, tack-free skin layer, without detracting from the physical properties characteristic of silicone rubber.

For prior art silicone rubber sponges, azobisisobutyronitrile (AIBN) is a typical blowing agent. AIBN, however, requires use of a sophisticated vulcanizing apparatus and a duration of post-cure therein since decomposed products of AIBN contain organic cyan compounds.

It was then proposed to use organic blowing agents such as azodicarbonamide (ADCA), p,p'-oxybis(benzenesulfonyl hydrazide) (OBSH) and dinitropentamethylenetetramine (DPT). These blowing agents have a higher decomposition temperature than AIBN and induce little blowing in the atmospheric hot air vulcanization (HAV) process which is a common molding technique of silicone rubber sponges. Even if sponges are obtained, they have large uneven cells.

JP-A 8-259816 discloses an organic azo blowing agent which decomposes into less toxic products. This proposal, however, is not fully satisfactory with respect to the reduction of toxicity and the uniformity of cells.

U.S. Pat. No. 6,096,792 discloses an organic blowing agent, 1,1'-azobis(1-acetoxy-1-phenylethane), which gives off malodor inherent to acid compounds when decomposed.

SUMMARY OF THE INVENTION

It would be desirable to have a blowing agent which is decomposable at an appropriate temperature to mold silicone rubber sponge and does not give off malodor. Among cyano group-free organic azo compounds, a focus is placed on a specific azo compound free of nitrile group as a blowing agent which is effective for foaming a silicone rubber composition and reducing a post-cure time.

Therefore, an object of the invention is to provide a silicone rubber sponge composition comprising a specific azo compound which allows the composition to be effectively blown and cured, without a need for long-term post-cure, into a sponge having a uniform fine cell structure and a smooth skin layer.

We have found that a silicone rubber sponge composition comprising (A) an organopolysiloxane of formula (1), (B) finely divided silica having a specific surface area of at least 50 m$^2$/g, and (C) an organic azo compound of formula (I), preferably dimethyl 1,1'-azobis(1-cyclohexane carboxylate), as essential components, can be blown, without a need for the blowing agent of azobisisobutyronitrile, into a silicone rubber sponge having a uniform fine cell structure and a smooth, tack-free skin layer.

According to the invention, there is provided a silicone rubber sponge composition comprising as essential components, (A) 100 parts by weight of an organopolysiloxane of the following average compositional formula (1):

$$R^1_a SiO_{(4-a)/2} \tag{1}$$

wherein $R^1$ is independently a substituted or unsubstituted monovalent hydrocarbon group and "a" is a positive number of 1.95 to 2.04, (B) 1 to 100 parts by weight of finely divided silica having a specific surface area of at least 50 m$^2$/g, and (C) 0.01 to 50 parts by weight of an organic azo compound of the following formula (I):

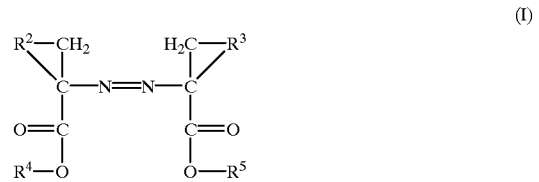

(I)

wherein $R^2$ and $R^3$ are independently alkylene groups, $R^4$ and $R^5$ are independently hydrogen or substituted or unsubstituted monovalent hydrocarbon groups.

In a preferred embodiment, the composition further includes a curing agent which is an organic peroxide, more preferably a mixture of a diacyl organic peroxide and another organic peroxide, or an addition reaction curing agent, or a combination of an organic peroxide with an addition reaction curing agent.

Also contemplated herein is a silicone rubber sponge obtained by blowing and curing the silicone rubber sponge composition.

DESCRIPTION OF THE PREFERRED EMBODIMENT

Component (A) of the silicone rubber sponge composition according to the invention is an organopolysiloxane of the average compositional formula (1).

$$R^1_a SiO_{(4-a)/2} \tag{1}$$

In formula (1), $R^1$ which may be the same or different is a substituted or unsubstituted monovalent hydrocarbon group, preferably of 1 to 12 carbon atoms, more preferably 1 to 8 carbon atoms, for example, alkyl groups such as methyl, ethyl, propyl, butyl, hexyl and dodecyl, cycloalkyl groups such as cyclohexyl, alkenyl groups such as vinyl, allyl, butenyl and hexenyl, aryl groups such as phenyl and tolyl, aralkyl groups such as benzyl and β-phenylpropyl, and substituted ones of the foregoing groups in which some or all of the hydrogen atoms attached to carbon atoms are replaced by halogen atoms, cyano groups or the like, such as chloromethyl, trifluoropropyl and cyanoethyl. Of these, methyl, phenyl, vinyl and trifluoropropyl are preferred. It is more preferred that methyl be included in an amount of at least 50 molt, especially at least 80 molt. The letter "a" is a positive number of 1.95 to 2.04, preferably 1.98 to 2.02.

The organopolysiloxanes may be ones whose molecular chain is end blocked with trimethylsilyl, dimethylvinylsilyl, dimethylhydroxysilyl, methyldivinylsilyl, trivinylsilyl or similar groups, although it is preferred to have at least one alkenyl group at the end. The organopolysiloxanes should preferably have at least two alkenyl groups attached to silicon atoms in a molecule. The content of alkenyl groups is preferably 0.001 to 5 molt, especially 0.01 to 0.5 mol % based on the $R^1$ groups. Of the alkenyl groups in $R^1$, vinyl is most preferred.

The organopolysiloxanes can be prepared, for example, by (co)hydrolytic condensation of one or more organohalogenosilanes, or ring-opening polymerization of a cyclic polysiloxane (trimer or tetramer of siloxane) in the presence of a basic or acidic catalyst. They are basically linear diorganopolysiloxanes which may be partially branched. Also a mixture of two or more organopolysiloxanes having different molecular structures or degrees of polymerization is useful. The organopolysiloxane should preferably have a viscosity at 25° C. of at least about 100 centistokes (cs), more preferably about 100,000 to 100,000,000 cs, and especially about 5,000,000 to 20,000,000 cs. The degree of polymerization is preferably at least about 100, more preferably at least about 3,000 and up to about 100,000, more preferably up to about 20,000.

Finely divided silica (B) is essential for producing silicone rubber sponge having mechanical strength. To this end, finely divided silica should have a BET specific surface area of at least 50 $m^2/g$, preferably 100 to 400 $m^2/g$. Examples of the finely divided silica include fumed silica (or dry silica) and precipitated silica (or wet silica), with the fumed silica (or dry silica) being preferred. Prior to use, the silica may be hydrophobized by surface treatment with organopolysiloxanes, organopolysilazanes, chlorosilanes, alkoxysilanes or the like. Such silicas may be used alone or in admixture of two or more. A mixture of fumed silica and precipitated silica is also useful.

The amount of finely divided silica added is 1 to 100 parts, preferably 5 to 100 parts, more preferably 10 to 90 parts, and even more preferably 30 to 80 parts by weight, per 100 parts by weight of the organopolysiloxane (A). Less than 1 part of silica is too small to achieve reinforcement whereas more than 100 parts of silica renders the composition less workable and can compromise the physical properties of silicone rubber.

The organic azo compound (C) is a component requisite to achieve the benefits of the invention. The organic azo compound used herein has an appropriate melting point and decomposition temperature for the molding of silicone rubber sponge. The organic azo compound of the invention ensures that a silicone rubber composition is effectively blown and cured in atmospheric hot air to form a sponge having a uniform fine cell structure and a smooth, tack-free skin layer. Although azobisisobutyronitrile requires a long time of post-cure as previously mentioned, the organic azo compound of the invention does not necessarily need post-cure.

The organic azo compound has the following formula (I).

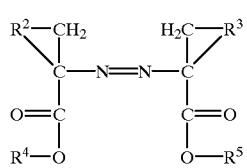

(I)

Herein $R^2$ and $R^3$, which may be the same or different, are alkylene groups, for example, those of 1 to 12 carbon atoms, especially 2 to 8 carbon atoms, such as methylene, ethylene, propylene, butylene and hexylene. $R^4$ and $R^5$, which may be the same or different, are hydrogen or substituted or unsubstituted monovalent hydrocarbon groups, for example, preferably alkyl groups of 1 to 12 carbon atoms, such as methyl, ethyl, propyl and butyl, with methyl being most preferred.

A typical organic azo compound is dimethyl 1,1'-azobis (1-cyclohexane carboxylate) which is represented by the structural formula (II) below.

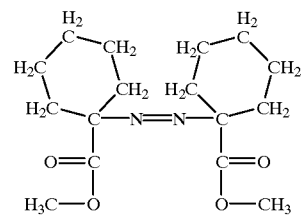

(II)

The amount of organic azo compound (C) blended is 0.01 to 50 parts, and preferably 0.5 to 10 parts by weight, per 100 parts by weight of the organopolysiloxane (A). Less than 0.01 part of the organic azo compound fails to provide a satisfactory blowing capability. With more than 50 parts of the organic azo compound, cells become uneven and no skin layer is formed.

For the inventive silicone rubber sponge composition, a curing agent is properly selected in accordance with a particular reaction mechanism employed to produce a rubbery elastomer. The reaction mechanism is preferably selected from (1) crosslinking reaction induced by organic peroxide vulcanizing agents, (2) crosslinking reaction through addition reaction, and (3) a combination of crosslinking reactions (1) and (2).

For (1) crosslinking reaction induced by organic peroxide vulcanizing agents, organic peroxides may be used, such as benzoyl peroxide, 2,4-dichlorobenzoyl peroxide, 4-methylbenzoyl peroxide, 2-methylbenzoyl peroxide, 2,4-dimethylbenzoyl peroxide, 1,6-bis(p-toluoylperoxycarbonyloxy)butane, 1,6-bis(2,4-dimethylbenzoylperoxycarbonyloxy)hexane, 2,5-dimethyl-bis(2,5-t-butylperoxy)hexane, t-butylperoxybenzoate, dicumyl peroxide, and cumyl t-butyl peroxide. Where atmospheric hot air vulcanization is carried out, diacyl organic peroxides such as benzoyl peroxide, 2,4-dichlorobenzoyl peroxide and 4-methylbenzoyl peroxide are preferably used. In this embodiment, it is preferred to use a mixture of the diacyl organic peroxide and another organic peroxide in a weight ratio between 1:9 and 9:1, especially between 2:8 and 8:2. An appropriate amount of the organic peroxide blended as the curing agent is 0.05 to 15 parts, more preferably 0.2 to 5 parts by weight, per 100 parts by weight of the organopolysiloxane (A). Less than 0.05 part of the organic peroxide may induce insufficient crosslinking whereas more than 15 parts of the organic peroxide achieves no further improvement in curing rate and can require a long time to remove unreacted peroxide and decomposition residues.

For (2) crosslinking reaction to take place through addition reaction, the organopolysiloxane (A) should be one in which at least two of the organic groups attached to silicon atoms in one molecule are alkenyl groups, especially vinyl groups.

The addition reaction catalyst may be any of well-known catalysts, for example, elemental metals of the platinum group and compounds thereof. Illustrative catalysts include platinum catalysts, for example, microparticulate platinum metal adsorbed on such carriers as silica, alumina and silica gel, platinic chloride, chloroplatinic acid, complexes of chloroplatinic acid hexahydrate with olefins or divinyldimethylpolysiloxane, and alcohol solutions of chloroplatinic acid hexahydrate, palladium catalysts, and rhodium catalysts. These catalysts are used in a catalytic amount, typically in the range of about 1 to 1,000 ppm, preferably about 10 to 500 ppm, calculated as platinum group metal. Less than 1 ppm of the catalyst may be too small to promote the crosslinking reaction, resulting in undercure. More than 1,000 ppm of the catalyst has little influence on reactivity and is economically superfluous.

A crosslinking agent for addition reaction is an organohydrogenpolysiloxane having at least two SiH groups in a molecule. It may be straight, branched or cyclic. Use may be made of organohydrogenpolysiloxanes which are well known as the curing agent for addition reaction curing type silicone rubber compositions. Most often, an organohydrogenpolysiloxane of the average compositional formula (2) below is employed.

$$R^4_x H_y SiO_{(4-x-y)/2} \qquad (2)$$

Herein, $R^4$ is, like $R^1$, a substituted or unsubstituted monovalent hydrocarbon group, preferably of 1 to 12 carbon atoms, more preferably 1 to 8 carbon atoms, for example, alkyl, alkenyl, aryl, aralkyl groups, and halo- or cyano-substituted ones of the foregoing groups. Letters x and y are positive numbers satisfying $0 \leq x < 3$, $0 < y \leq 3$, preferably $1 \leq x \leq 2.2$, $0.002 \leq y \leq 1$, and $1.002 \leq x+y \leq 3$. At least two, preferably at least three SiH groups are contained in one molecule and may be positioned at the ends or an intermediate of the molecular chain. The organohydrogenpolysiloxane should preferably have a viscosity of less than about 300 cs at 25° C. An appropriate amount of the organohydrogenpolysiloxane blended is 0.01 to 20 parts by weight per 100 parts by weight of the organopolysiloxane (A). More preferably, the organohydrogenpolysiloxane is blended in such amounts that 0.5 to 10, especially 1 to 4 hydrogen atoms attached to silicon atoms are present per alkenyl group in component (A). On this basis, less than 0.5 hydrogen atom may fail to achieve sufficient crosslinking and hence, sufficient mechanical strength. More than 10 hydrogen atoms may cause to degrade physical properties after curing, and especially invite noticeable losses of heat resistance and compression set.

In the embodiment wherein silicone rubber sponge compositions are subject to crosslinking reaction through addition reaction, any of well-known platinum catalyst inhibitors such as polymethylvinylsiloxane cyclic compounds and acetylene group-containing alcohols is preferably added.

It is also possible to use an organic peroxide, an addition reaction catalyst for promoting crosslinking reaction through addition reaction, and an organohydrogenpolysiloxane in combination as the curing agent. The blending proportions of these components are the same as described above.

If desired, additives or auxiliaries may be added to the silicone rubber sponge compositions of the invention. Illustrative additives or auxiliaries include non-reinforcing silica such as ground quartz and diatomaceous earth, carbon black such as acetylene black, furnace black and channel black, fillers such as calcium carbonate, colorants, heat resistance improvers, flame retardance improvers, acid acceptors, heat transfer improvers, parting agents, and dispersants such as alkoxysilanes, diphenylsilane diols, carbon functional silanes and both end silanol-blocked low molecular weight siloxanes.

The silicone rubber sponge compositions of the invention can be obtained by intimately mixing the above-described components in a suitable rubber masticating machine such as a two roll mill, Banbury mixer, dough mixer or kneader.

Silicone rubber sponges can be obtained simply by heating the silicone rubber sponge compositions thus prepared for inducing blowing and curing. The curing/blowing process may be any desired one as long as it can supply sufficient heat to bring about decomposition of the blowing agent and vulcanization of silicone rubber. The molding technique is not critical as well, and may be selected from extrusion molding entailing continuous vulcanization, press molding, injection molding and the like. In the practice of the invention, atmospheric hot air vulcanization is preferably employed. Preferred conditions in this case include a heating temperature of about 100 to 500° C., especially about 200 to 400° C., and a heating time of about several seconds to about 1 hour, especially about 10 seconds to about 30 minutes. This is followed by secondary vulcanization at about 180 to 250° C. for about 1 to 10 hours, if desired.

EXAMPLE

Examples of the invention are given below by way of illustration and not by way of limitation. All parts are by weight.

Example 1

Compound 1 was prepared by mixing in a kneader 100 parts of an organopolysiloxane consisting of 99.825 mol % of dimethylsiloxane units, 0.15 mol % of methylvinylsiloxane units and 0.025 mol % of dimethylvinylsiloxane units and having an average degree of polymerization of about 8,000, 45 parts of fumed silica having a specific surface area of 200 m²/g (Aerosil 200 by Nippon Aerosil Co., Ltd.), and 10 parts of dimethylpolysiloxane blocked with silanol groups at both ends and having an average degree of polymerization of 13 and a viscosity of 15 cs at 25° C. as a dispersant, and heat treating the mixture at 180° C. for 3 hours.

Compound 1, 100 parts, was blended with 4 parts of dimethyl 1,1'-azobis(1-cyclohexane carboxylate), 1.0 part of a 50% silicone oil paste of 4-methylbenzoyl peroxide, and 0.6 part of dicumyl peroxide. Using a two-roll mill, the mixture was formed into a sheet of 2 mm thick, which was heated at 250° C. for 10 minutes into a sponge. The sponge had a blowing magnification of 420%, remained uncolored, contained uniform fine cells with a size of less than 1 mm, and had a smooth tack-free surface.

Example 2

Compound 1, 100 parts, was blended with 4 parts of dimethyl 1,1'-azobis(1-cyclohexane carboxylate), 1.0 part of a 50% silicone oil paste of 1-methylbenzoyl peroxide, and 0.6 part of dicumyl peroxide. Using a two-roll mill, the mixture was formed into a sheet of 2 mm thick, which was heated at 250° C. for 10 minutes into a sponge. The sponge had a blowing magnification of 400%, remained uncolored, contained uniform fine cells with a size of less than 1 mm, and had a smooth tack-free surface.

Example 3

Compound 1, 100 parts, was blended with 4 parts of dimethyl 1,1'-azobis(l-cyclohexane carboxylate), 1.0 part of a 50% silicone oil paste of 4-methylbenzoyl peroxide, 0.5 part of polyvinylsiloxane complex of a platinum compound, 0.05 part of 1-ethynylcyclohexan-1-ol and 1.0 part of both end trimethylsiloxy group-blocked dimethylsiloxane/methylhydrogensiloxane copolymer (Si—H: 0.007 mol/g). Using a two-roll mill, the mixture was formed into a sheet of 2 mm thick, which was heated at 250° C. for 10 minutes into a sponge. The sponge had a blowing magnification of 420%, remained uncolored, contained uniform fine cells with a size of less than 1 mm, and had a smooth tack-free surface.

Example 4

Compound 1, 100 parts, was blended with 4 parts of dimethyl 1,1'-azobis(1-cyclohexane carboxylate), 0.5 part of polyvinylsiloxane complex of a platinum compound, 0.05 part of 1-ethynylcyclohexan-1-ol and 1.0 part of both end trimethylsiloxy group-blocked dimethylsiloxane/methylhydrogensiloxane copolymer (Si—H: 0.007 mol/g). Using a two-roll mill, the mixture was formed into a sheet of 2 mm thick, which was heated at 250° C. for 10 minutes into a sponge. The sponge had a blowing magnification of 450%, remained uncolored, contained uniform fine cells with a size of less than 1 mm, and had a smooth tack-free surface.

Comparative Example 1

Compound 1, 100 parts, was blended with 2 parts of azobisisobutyronitrile, 1.0 part of a 50% silicone oil paste of 4-methylbenzoyl peroxide, and 0.6 part of dicumyl peroxide. Using a two-roll mill, the mixture was formed into a sheet of 2 mm thick, which was heat treated at 250° C. for 10 minutes into a sponge. The sponge had a blowing magnification of 400%, remained uncolored, contained uniform cells with a size of less than 1 mm, and had a smooth tack-free surface. Regrettably, secondary vulcanization at 200° C. for 4 hours was needed in order to remove the decomposition products of azobisisobutyronitrile.

Comparative Example 2

Compound 1, 100 parts, was blended with 2 parts of azobisisobutyronitrile, 0.5 part of polyvinylsiloxane complex of a platinum compound, 0.05 part of 1-ethynylcyclohexan-1-ol and 1.0 part of both end trimethylsiloxy group-blocked dimethylsiloxane/methylhydrogensiloxane copolymer (Si—H: 0.007 mol/g). Using a two-roll mill, the mixture was formed into a sheet of 2 mm thick, which was heat treated at 250° C. for 10 minutes into a sponge. The sponge had a blowing magnification of 150% and contained uneven cells with a size of more than 1 mm.

Comparative Example 3

Compound 1, 100 parts, was blended with 4 parts of 1,1'-azobis(1-acetoxy-1-phenylethane), 1.0 part of a 50% silicone oil paste of 4-methylbenzoyl peroxide, and 0.6 part of dicumyl peroxide. Using a two-roll mill, the mixture was formed into a sheet of 2 mm thick, which was heat treated at 250° C. for 10 minutes into a sponge. The sponge had a blowing magnification of 300%, was colored yellow, and contained uneven cells with a size of more than 1 mm. In addition, stimulant acetic odor was given off during vulcanization.

Comparative Example 4

Compound 1, 100 parts, was blended with 4 parts of 1,1'-azobis(1-acetoxy-1-phenylethane), 0.5 part of polyvinylsiloxane complex of a platinum compound, 0.05 part of 1-ethynylcyclohexan-1-ol and 1.0 part of both end trimethylsiloxy group-blocked dimethylsiloxane/methylhydrogensiloxane copolymer (Si—H: 0.007 mol/g). Using a two-roll mill, the mixture was formed into a sheet of 2 mm thick, which was heat treated at 250° C. for 10 minutes into a sponge. The sponge had a blowing magnification of 350% and contained uneven cells with a size of more than 1 mm. In addition, stimulant acetic odor was given off during vulcanization.

Comparative Example 5

Compound 1, 100 parts, was blended with 2 parts of azodicarbonamide (ADCA), 1.0 part of a 50% silicone oil paste of 4-methylbenzoyl peroxide, and 0.6 part of dicumyl peroxide. Using a two-roll mill, the mixture was formed into a sheet of 2 mm thick, which was heat treated at 250° C. for 10 minutes into a sponge. The sponge had a blowing magnification of 120%, indicating inefficient blowing.

Comparative Example 6

Compound 1, 100 parts, was blended with 2 parts of dimethyl 2,2'-azobisisobutyrate, 1.0 part of a 50% silicone oil paste of 4-methylbenzoyl peroxide, and 0.6 part of dicumyl peroxide. Using a two-roll mill, the mixture was formed into a sheet of 2 mm thick, which was heat treated at 250° C. for 10 minutes into a sponge. The sponge had a blowing magnification of 300% and contained uneven cells with a size of more than 1 mm. The blowing agent, dimethyl 2,2'-azobisisobutyrate was liquid so that the compound stuck to the rolls during the compounding step, noticeably obstructing the milling operation.

There has been described a silicone rubber sponge composition comprising a non-cyano type organic azo compound of formula (I). The composition has good blowing capability and offers a silicone rubber sponge which is fully safe even when a long term of post-cure is eliminated, contains uniform fine cells and has a smooth tack-free skin layer.

Japanese Patent Application No. 2000-348593 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:
1. A silicone rubber sponge composition comprising
(A) 100 parts by weight of an organopolysiloxane of the following average compositional formula (1):

$$R^1_a SiO_{(4-a)/2} \quad (1)$$

wherein $R^1$ is independently a substituted or unsubstituted monovalent hydrocarbon group and "a" is a positive number of 1.95 to 2.04,
(B) 1 to 100 parts by weight of finely divided silica having a specific surface area of at least 50 $m^2/g$, and
(C) 0.01 to 50 parts by weight of an organic azo compound of the following formula (I):

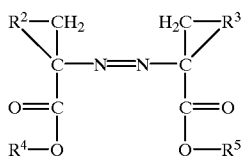
(I)

wherein $R^2$ and $R^3$ are independently alkylene groups, $R^4$ and $R^5$ are independently hydrogen or substituted or unsubstituted monovalent hydrocarbon groups.

2. The composition of claim 1 wherein said organic azo compound (C) is dimethyl 1,1'-azobis(1-cyclohexane carboxylate).

3. The composition of claim 1 wherein said finely divided silica (B) is fumed silica.

4. The composition of claim 1 further comprising a curing agent which is an organic peroxide.

5. The composition of claim 4 wherein the curing agent is a mixture of a diacyl organic peroxide and another organic peroxide.

6. The composition of claim 1 further comprising a curing agent which is an addition reaction curing agent.

7. The composition of claim 1 further comprising an organic peroxide and an addition reaction curing agent as a curing agent.

8. A silicone rubber sponge obtained by blowing and curing the silicone rubber sponge composition of claim 1.

* * * * *